INVENTORS
Harold B. Underwood
Henry G. Shakespeare

Jan. 20, 1970  H. B. UNDERWOOD ET AL  3,490,714
SINGLE-ACTION HEAVY DUTY FLY REEL
Filed Dec. 21, 1967  3 Sheets-Sheet 2

INVENTORS
Harold B. Underwood
Henry G. Shakespeare

BY Hueschen & Kurlandsky
ATTORNEYS

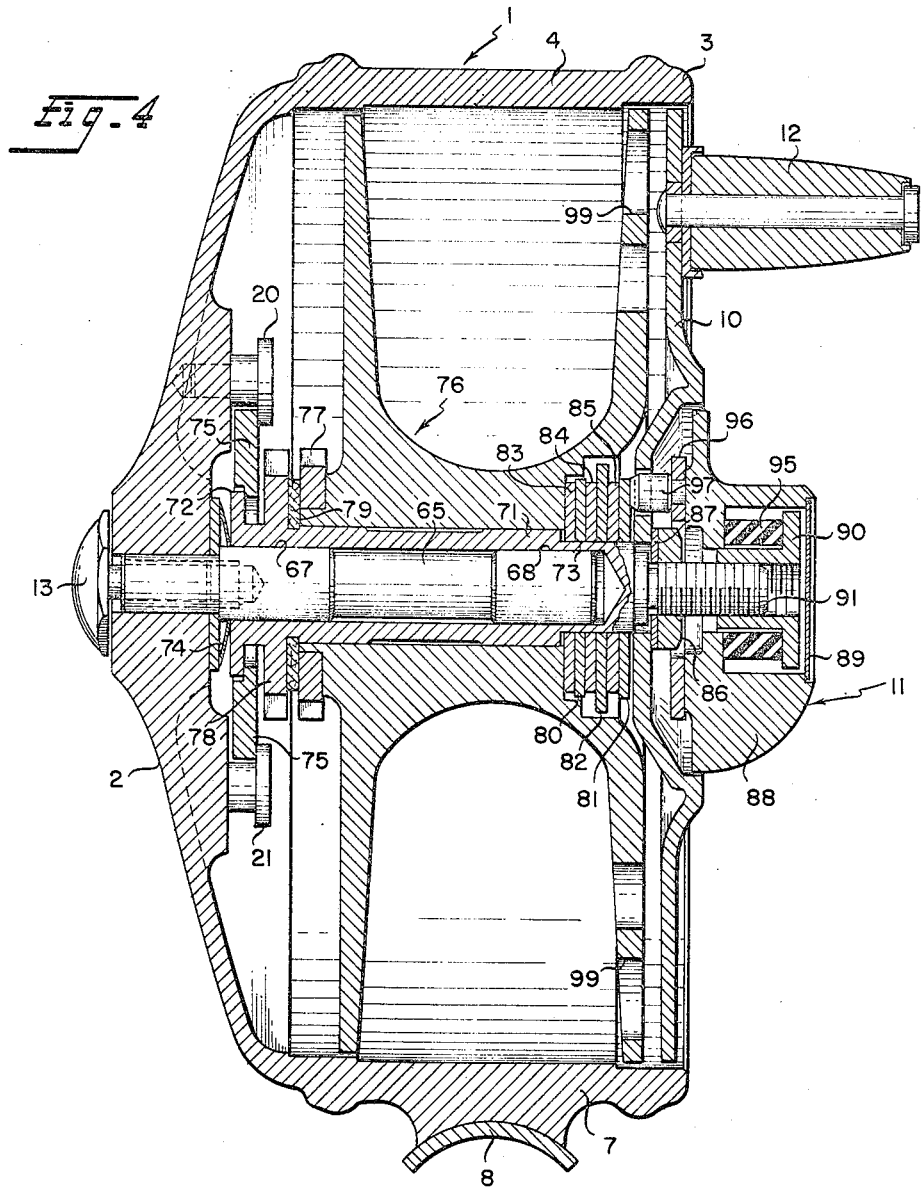
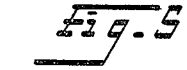
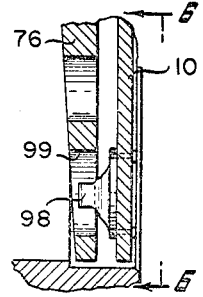
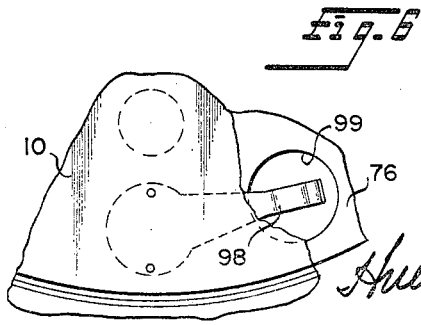
INVENTORS
Harold B. Underwood
Henry G. Shakespeare
ATTORNEYS United States Patent Office 3,490,714
Patented Jan. 20, 1970

3,490,714
SINGLE-ACTION HEAVY DUTY FLY REEL
Harold B. Underwood and Henry G. Shakespeare, Kalamazoo, Mich., assignors to Shakespeare Company, Kalamazoo, Mich., a corporation of Michigan
Filed Dec. 21, 1967, Ser. No. 692,502
Int. Cl. A01k *89/02*
U.S. Cl. 242—84.46　　　　　　　　　　　　　4 Claims

ABSTRACT OF THE DISCLOSURE

A heavy duty fly reel comprising a frame, a spool assembly rotatably mounted in the frame, and manually operable drive means operatively connected to the spool through an adjustable drag clutch, the reel being provided with disengageable click means and disengageable non-reverse ratchet means, and a two-position manually operable means having two alternative limiting positions of rest, in one position causing the non-reverse ratchet means to be engaged and the click means to be disengaged, and in the other position causing the non-reverse ratchet means to be disengaged and the click means to be engaged.

Background of the invention

The present invention relates to fishing reels, and is more particularly concerned with a fly reel.

Fly reels of the heavy duty type are generally provided with a drive means in the form of a crank or a disc having a handle mounted at its periphery. A spool is provided for supporting the line. In order to prevent a sudden strong pull by a fish from breaking the line before the fisherman can release the line, it is customary to provide a slip clutch between the drive and the spool so that a force greater than that predetermined by the adjustment of the clutch causes the spool to unwind even though the drive is held in place. It is additionally conventional to provide means for producing a clicking signal when the spool is turning to warn the fisherman that the line is being payed out. Such click signal arrangements generally are provided with a control whereby the clicking mechanism can alternatively be placed in and out of engagement.

It is also traditional in reels of the type described to have a ratchet arrangement which can be engaged and disengaged, and which in the engaged position prevents the drive from reversing, but which does not prevent the reel from rotating when a force greater than the drag provided by the adjustable clutch is applied to the line. Although in prior art devices, structures of the type described have been satisfactory, the fact that each is separately controlled adds to the inconvenience of using the reel, particularly during the excitement of fighting a large fish which has just been hooked.

Summary of the invention

It is an object of the present invention to provide a fly reel of the heavy duty type which is provided with an adjustable clutch coupling the drive member to the spool. It is a further object to provide a fly reel having a click-producing assembly which may be alternatively engaged or disengaged. It is still further an object of the invention to provide a fly reel having a ratchet arrangement which can be alternatively engaged or disengaged, and which when engaged prevents the drive assembly from reversing and thereby releasing line without application of the clutching force applied to the spool. It is a primary object of the invention to provide a fly reel of the type described in which the engagement and disengagement of the ratchet and disengagement and engagement of the click producing assembly are accomplished by a single manually operated control. The accomplishment of the foregoing and additional objects will become more fully apparent hereinafter.

According to the invention, a heavy duty fly reel is provided having a frame housing, drive means rotatably mounted in the housing, and a line spool rotatably mounted and connected to the drive means by a drag clutch. A click-producing ratchet wheel is fixedly mounted on the spool and a non-reverse ratchet wheel is fixedly mounted on the drive assembly. A lever, cam, and wire spring assembly is provided which in one position causes the primary click mechanism to operate and the non-reverse ratchet to be disengaged, and in the other position engages the nonreverse ratchet and disengages the primary click mechanism.

Brief description of the drawings

The invention in its preferred embodiment is illustrated by the accompanying drawings in which:

FIG. 4 is a cross-sectional view taken at the line 4—4 of FIG. 3.

FIG. 5 is a fragmentary cross-sectional view illustrating a modified embodiment of the invention; and FIG. 6 is a cross-sectional view partly broken away taken at the line 6—6 of FIG. 5.

Description of the preferred embodiments

Reference is now made to the accompanying drawings for a better understanding of the invention, wherein all the parts are numbered and wherein the same numbers are used to refer to the same parts throughout.

Figure 1:
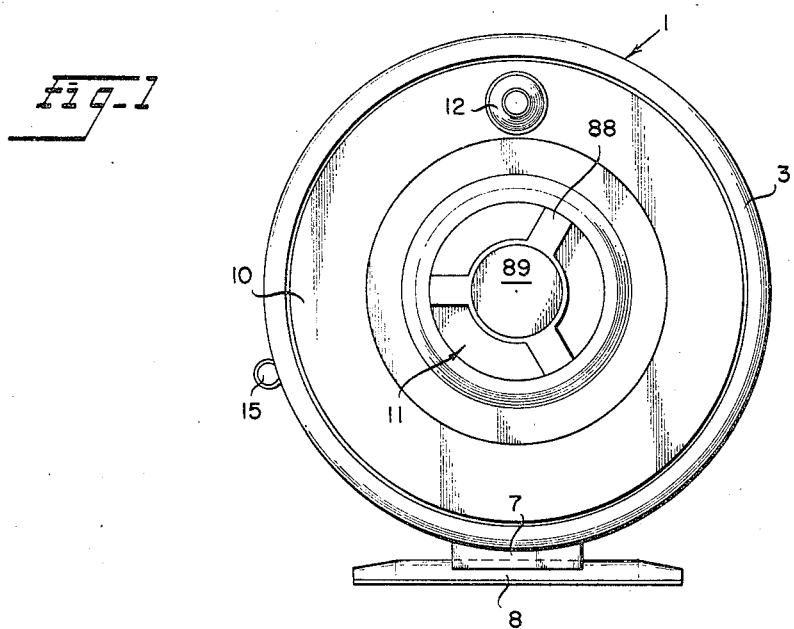
FIG. 1 is a side elevational view showing one side of the reel.
Figure 2:
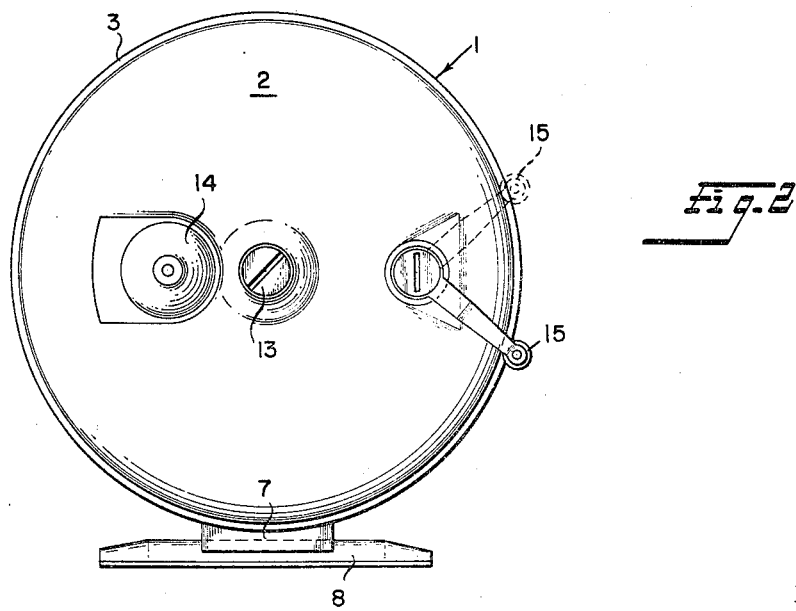
FIG. 2 is a side elevational view showing the other side of the reel.

Referring to FIGS. 1 and 2, the reel comprises a frame 1 defining a housing 2 and a protective rim 3 maintained in spaced-apart relationship from the housing 2 by means of three webs 4, one of which is shown in FIG. 4, and a mounting pedestal 7. The webs 4 and pedestal 7 are equally spaced about the periphery of the frame. A rod clip 8 is mounted on the pedestal by means of screws 9. As shown in FIG. 1, the reel further comprises a crank plate 10, drag adjusting nut assembly 11 and a handle 12 rotatably mounted on the crank plate 10. Referring to FIG. 2, there is shown the main shaft mounting screw 13, the release lever actuating button 14 and throw-out lever 15.

Figure 3:
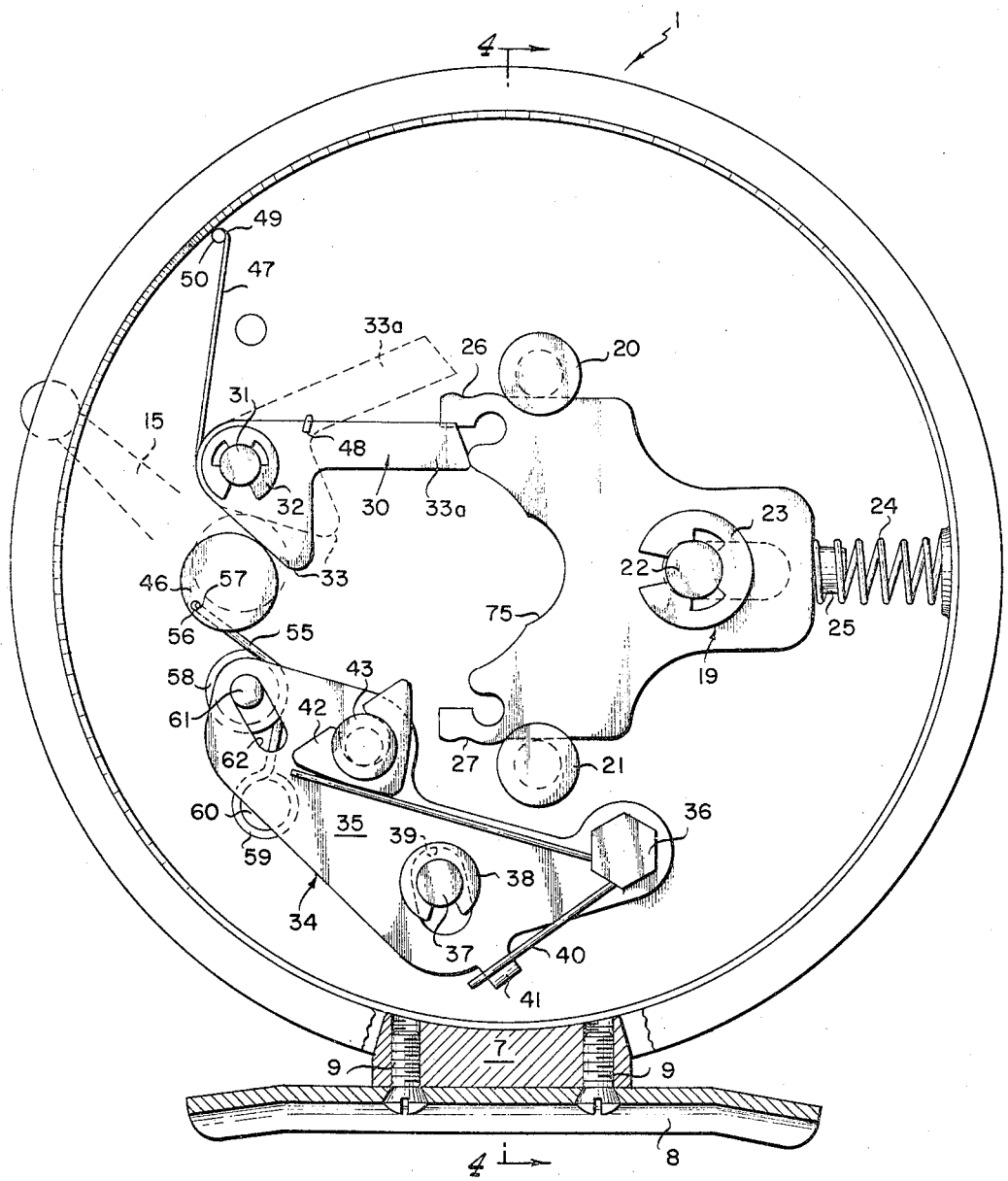
FIG. 3 is a longitudinal section of the reel.

Referring to FIG. 3, the structure within the housing comprises a spool retaining lever 19 formed of a material such as nylon and slidably mounted by means of retaining studs 20 and 21 and a stud 22 mounted in the release lever actuating button, and having a retaining washer 23 affixed to the end thereof and maintaining the release lever 19 in place. A compression spring 24 mounted on a spring retaining stud 25 forming a part of the release lever maintains the release lever 19 in biased position away from the housing wall. The release lever 19 is provided at its ends with detents 26 and 27 which cooperate with the studs 20 and 21 to maintain the release lever in open position until released by engaging and pushing the button 14 radially inward. The housing structure further includes a non-reverse pawl 30 pivotally mounted on a stud 31 and maintained in place by a retaining washer 32. A portion of the pawl is defined as a cam follower 33. Another portion 33a is the operation lever portion thereof.

The click producing mechanism comprises a ratchet plate assembly 34, comprising a ratchet plate 35 pivotally mounted on a stud 36 and further supported by a stud 37 and retaining washer 38 disposed in a slot 39. A spring 40 is mounted over the shaft of the stud 36 and has one end engaged by a retaining tang 41, and the other end engaging a click pawl 42 mounted and retained on a stud 43, the click pawl 42 being urged upwardly by the spring 40.

The structure for alternatively engaging and disengaging the click pawl and non-reverse pawl comprises a cam 46 having a shaft of elongated cross section engaging a complementary slot in the throw-out lever 15. The cam surface 33 of the non-reverse pawl 30 engages the surface of the cam 46 and is maintained in engagement with the surface of the cam 46 by means of a wire spring 47 which is wound around the stud 31 and has one end 48 engaging the non-reverse pawl and the other end 49 anchored against a protuberance 50 molded into the housing.

The ratchet plate assembly 34 is operatively connected to the throw-out lever 15 by means of a wire spring 55 having a turned up end 56 engaged in a hole 57 provided in the cam 46. The wire spring is further looped about a floating click pawl cam stud 58 and has a loop 59 formed at its other end anchored to a stud 60. A reduced end 61 of the cam stud 58 is engaged in a cam slot 62 provided in the ratchet plate 35.

As seen in FIG. 4, the main shaft 65 is mounted on the housing by means of the screw 13. The shaft 65 is provided with bearing surfaces 67 and 68. The spool assembly comprises a ratchet stem 71 having a retaining flange 72 at one end and a flattened portion 73 at the other end. The outer surface of the retaining flange 72 engages a dished washer 74, and the inner surface of the retaining flange 72 is engaged by the engaging portion 75 of the release lever 19.

Journalled over the ratchet stem 71 is a line spool 76 having a click ratchet wheel 77 affixed at one end. The ratchet stem 71 is provided with a non-reverse ratchet wheel 78 affixed thereto in spaced-apart relationship from the retaining flange 72, thereby permitting the engaging portion 75 of the release lever to be disposed between the flange 72 and the ratchet wheel 78. A friction washer 79 is disposed intermediate the non-reverse ratchet wheel 78 and the click ratchet wheel 77.

The crank plate 10 is coupled to the line spool by means of drag washers comprising metal washers 80 and 81 engaging the out-of-round portion 73 of the ratchet stem 71, a metal washer 82 having tabs engaging notches provided in the spool, and friction washers 83, 84, and 85. The assembly is held together by means of a nut 86 and washer 87 combination. Adjustable friction is provided by means of the drag adjusting nut assembly 11 which comprises an adjusting nut 88, cover plate 89, and a screw member 90 engaging a screw 91 comprising the end of the ratchet stem 71. The screw member 90 operates against a rubber spring 95 to force the adjusting nut 88 against an anchored washer 96 having lugs 97 which engage and provide force against the metal washer 81, thereby providing an adjustable friction clutch action.

The fly reel of the present invention is so designed that, when the throw-out lever 15 is in its upper position, the non-reverse pawl 30 engages the peripheral teeth of the non-reverse ratchet wheel 78. At the same time, the click pawl 42 has been retracted. In this condition, when the crank plate is rotated in a forward or line-retrieving direction, the spool is moved forward and a soft click is produced by the non-reverse ratchet wheel 78 and non-reverse pawl 30. If the crank plate is attempted to be rotated in a reverse direction, pawl 30 engages the ratchet teeth and prevents any reverse movement. However, if a reverse or unwinding force is applied to the spool as by a fish pulling on the line, the spool reverses against the clutch when the force is great enough, but without any click signal being produced. In this condition, the soft click arrangement of the alternative embodiment may be used to produce a warning signal of line pull out.

When the throw out lever 15 is placed in its lower position, the cam surface of the cam 46 engages the cam follower surface 33 of the pawl 30 and causes the operation lever portion 33a of the pawl to be elevated out of engagement with the ratchet wheel 78. At the same time, the cam 46 extends the end 56 of the spring 55, causing the cam stud member 61 to advance in the cam slot 62 and to move the ratchet plate assembly 34 so that the click pawl 42 engages the teeth of the click ratchet wheel 77, the spring 40 biasing the click pawl 42 in engagement with the teeth of the click ratchet wheel 77. In this condition, when the spool 76 rotates, either forward or in reverse as a result of manipulation of the crank plate 10, or in reverse as a result of force applied by a fish, a loud click signal is produced. However, in this condition no click signal is produced when the crank plate is rotated but where the force retaining the spool is greater than the force of the friction drag so that the spool does not rotate.

In an improved embodiment of the invention as shown in FIGS. 5 and 6, an additional soft click signal may be provided by means of a spring finger 98 mounted on the crank plate 10 and adjusted to engage a plurality of holes or protuberances 99 provided near the periphery of one wall of the spool. The soft click produced by this arrangement becomes audible when the loud click provided by the click pawl 42 operating against the click ratchet wheel 77 is in disengaged position.

In the improved embodiment illustrated, the subsidiary click arrangement comprising the finger 98 engaging the plurality of peripheral holes or protuberances 99 produces a soft click at any time that the crank plate 10 and the spool 76 rotate with respect to each other. Consequently, the soft click assembly can be used to produce a soft click signal when the spool is stationary but when the crank plate rotates or, alternatively, when the crank plate is stationary and the reel rotates. However, in the latter instance, the contribution of a soft click assembly will be overshadowed by the loud click when the click pawl 42 is properly engaged with the click ratchet wheel 77 and when the spool is caused to turn. The soft click assembly is also functional when the throw-out lever 15 is placed in the position in which the non-reverse pawl 30 is engaged with the non-reverse ratchet wheel 78, and wherein the click pawl 42 is disengaged. In this condition, the ratchet assembly itself produces a soft click when the crank plate 10 is rotated in a forward direction. However, when the crank plate 10 is stationary and the spool 76 rotates, no click would normally be heard, and the soft click assembly thus adds a signal in this condition.

The present invention provides a major improvement over heavy duty fly reels of the prior art. It provides a loud click arrangement to indicate that line is being pulled out. It also provides a non-reverse means and adjustable drag arrangement which may be accurately pre-determined and which operates in the absence of the loud clicks in order to play large fish. Moreover, in the improved embodiment, means is provided comprising a leaf spring positioned intermediate the outer plate and spool wall engaging a series of holes or bumps provided on a wall of the spool, thereby providing a quieter running click in order to indicate when line is being payed out against the drag for playing of small fish when the loud click is disengaged. Although nonreverse ratchet and primary click arrangements have been provided in prior art reels, it has been necessary to utilize separate controls for each function. The present invention provides means whereby both functions can be controlled by a single lever which is so designed that it alternatively engages the non-reverse ratchet mechanism or the loud click signal producing mechanism, thereby greatly facilitating control even in the hands of an inexperienced fisherman.

It is to be understood that the invention is not limited to the exact details of construction, operation, or exact materials or embodiments shown and described, as obvious modifications and equivalents will be apparent to one skilled in the art, and the invention is therefore to be limited only by the scope of the appended claims.

We claim:
1. A fly reel comprising a frame having means for being affixed to a rod and defining a housing, a spool rotatably mounted on said frame, manually operable drive means rotatably mounted in said frame, a non-reverse ratchet wheel affixed to said drive means, a click ratchet wheel fixedly mounted at the end of said spool and adjacent said non-reverse ratchet wheel, a manual operating lever mounted externally of said housing having two alternative limiting positions of rest, a non-reverse pawl pivotally mounted in said housing having spring means urging said non-reverse pawl toward engagement with said non-reverse ratchet wheel, a click pawl operating assembly mounted in said housing having a click pawl and a spring biasing said click pawl toward engagement with said click ratchet wheel, means operatively connecting said click pawl operating assembly and said non-reverse pawl with said manual operating lever, the arrangement being such that in one position of said operating lever said non-reverse pawl is engaged with said non-reverse ratchet wheel and said click pawl is disengaged from said click ratchet wheel, and whereby in the other position of said operating lever said non-reverse pawl is disengaged from said non-reverse ratchet wheel and said click pawl is engaged with said click ratchet wheel.

2. A fly reel comprising a frame having means for being affixed to a rod and defining a housing, a shaft affixed at one end to said housing, a spool and drive assembly comprising a tubular ratchet stem rotatably mounted on said shaft, disengageable means for retaining said ratchet stem on said shaft, drive means affixed to one end of said ratchet stem, a spool rotatably mounted on said ratchet stem, an adjustable friction clutch means operatively coupling said drive means to said spool, a non-reverse ratchet wheel fixedly mounted on said ratchet stem, and a click ratchet wheel fixedly mounted at the end of said spool and adjacent said non-reverse ratchet wheel, a manual operating lever mounted externally of said housing having two alternative limiting positions of rest, an operating cam, having a cam surface, mounted in said housing and affixed to said operating lever, a non-reverse pawl pivotally mounted in said housing having a cam follower, spring means engaging said non-reverse pawl and urging said cam follower in engagement with said cam surface, a click pawl operating assembly pivotally mounted in said housing having a click pawl and a spring biasing said click pawl toward engagement with said click ratchet wheel, and means operatively connecting said click pawl operating assembly with said operating cam, the arrangement being such that in one position of said operating lever said non-reverse pawl is engaged with said non-reverse ratchet wheel and said click pawl is disengaged from said click ratchet wheel, and whereby in the other position of said operating lever, said non-reverse pawl is disengaged from said non-reverse ratchet wheel and said click pawl is engaged with said click ratchet wheel.

3. A fly reel according to claim 2, wherein one wall of said spool is provided with a plurality of holes or protuberances peripherally arranged, and said drive means is provided with spring means adapted to engage said holes or protuberances to provide a secondary click signal.

4. A fly reel according to claim 2, wherein said click pawl operating assembly comprises a plate pivotally mounted in said housing, a click pawl slidably mounted on such plate, and spring means biasing said click pawl toward engagement with said click ratchet wheel, a floating cam stud mounted between said plate and said housing having a cam member of reduced diameter, a slot provided in said plate receiving said cam member, and a wire spring having one end anchored about a lug affixed to said frame, a mid-portion looped about said cam stud, and the other end pivotally engaging a peripheral portion of said operating cam.

References Cited

UNITED STATES PATENTS

| 790,676 | 5/1905 | Carlton | 242—84.51 |
| 2,572,319 | 10/1951 | Clarke | 242—84.51 |
| 3,123,319 | 3/1964 | Hull | 242—84.51 |

BILLY S. TAYLOR, Primary Examiner

U.S. Cl. X.R.
242—84.51, 84.54